United States Patent
Demers et al.

[11] 3,851,301
[45] Nov. 26, 1974

[54] METHOD AND APPARATUS FOR BALANCING AN ULTRASONIC DETECTION SYSTEM

[75] Inventors: Edward A. Demers, Singac; George V. Hectus, Verona; Ronald C. Fester, Rutherford, all of N.J.

[73] Assignee: Walter Kidde & Company Inc., Belleville, N.J.

[22] Filed: Sept. 15, 1972

[21] Appl. No.: 289,424

[52] U.S. Cl. .............................. 340/15, 340/258 A
[51] Int. Cl. ............................................. H04b 11/00
[58] Field of Search........ 340/5 C, 3 D, 258 A, 410; 73/1 DV

[56] References Cited
UNITED STATES PATENTS

| | | | |
|---|---|---|---|
| 2,706,285 | 4/1955 | Scott | 340/5 C |
| 2,779,936 | 1/1957 | Loudon et al. | 340/258 A |
| 2,903,683 | 9/1959 | Bagno | 340/258 A |
| 3,022,496 | 2/1962 | Bagno | 340/410 |
| 3,659,255 | 4/1972 | Trott | 73/1 DV |

Primary Examiner—Maynard R. Wilbur
Assistant Examiner—T. M. Blum
Attorney, Agent, or Firm—Darby & Darby

[57] ABSTRACT

A method and apparatus for equalizing the sensitivity of an ultrasonic detection system of the type using Doppler frequency in which a test unit generates a spectrum of energy of different frequencies, and transmits the spectrum through transducers located in the areas to be protected, to create, at a receiving transducer, an average standing-wave power density proportional to the total traveling-wave power density. The average standing-wave power density is measured to provide a means of equalizing detection sensitivity.

16 Claims, 7 Drawing Figures

METHOD AND APPARATUS FOR BALANCING AN ULTRASONIC DETECTION SYSTEM

BACKGROUND OF THE INVENTION

The present invention relates to an ultrasonic intruder detection system which operates by receiving energy reflected from a moving object, and in particular to a method and apparatus for balancing such a system. In ultrasonic detection systems the space to be protected usually includes an ultrasonic transducer which transmits energy of a given frequency. This energy is usually in the range from about 19khz to about 45 khz, although other frequencies can be used. The ultrasonic energy is reflected from the walls and other objects in the space resulting in a standing-wave pattern of energy which is received by a receiving transducer. The received energy is conveyed to suitable electronic circuitry and analyzed. If no motion occurs in the protected space, the frequency of the received energy will be the same as the frequency of the transmitted energy, termed the base frequency, $f_c$. If, however, there is a moving object in the space, the waves reflected or otherwise affected by the object will have a frequency different from the transmitted base frequency, the frequency difference usually being due to a doppler effect, and hence being termed the doppler frequency. Circuitry is provided which detects the presence or absence of a doppler frequency and which actuates an alarm whenever appropriate doppler frequencies are detected.

The sensitivity of the ultrasonic system described above is extremely great, so much so that one of the primary problems involved in devising a commercially-useful intruder-detection system is the reduction of the sensitivity of the system so that false alarms will not result. Numerous factors give rise to such false alarms, some of them relatively easy to overcome. For example, since the amplitude of the doppler signal is in part dependent upon the magnitude or size of the moving reflecting object, the gain of the system can be adjusted by a sensitivity-adjustment control to respond to the movement of a human but not to small objects, such as a mouse.

Other factors can also result in the production of an unwanted alarm indication. For example, the wavelength of ultrasonic energy varies as it passes from a medium of one density, such as cold air, to a medium of a different density, such as warm air, and if the boundary surface between the media of unequal densities is not stationary, difference frequencies will be generated. This is very common occurrence and may result from a draft caused by an open window, a fan circulating the air or an air-conditioning system. Also, extraneous shockwaves originating from outside of the protected area may artifically insert energy having a different frequency than the base frequency so as to result in the production of a doppler frequency sufficient to set off the alarm.

The difficulties present in setting the sensitivity of the receiver transducer for a single room are compounded when there is a multiplicity of receiver transducers in a number of different rooms. It becomes necessary in such circumstances to "balance" the overall system so that no single receiver transducer is too sensitive.

In the past, several methods have been employed to attempt to balance the overall sensitivity of an ultrasonic intruder-detection system so that false alarms due to small moving objects, such as mice, or fluctuations in the air currents in the space to be protected, would not set off the alarm. The most common of these methods has been to simulate in the space being protected the actual conditions under which the system is to operate and then have someone walk through the area. The sensitivity of the system is usually set to correspond to the amplitude of doppler signal produced by a "normal-size" human. The system usually incorporates circuitry such that a certain number of steps of the intruder is required to trigger the alarm. This has been accomplished by using an integrating circuit at the output of the doppler-frequency detection circuits. Such a system prevents, for example, both a small animal and a large falling object within the protected space from setting off the alarm.

The major difficulty with such a "walk-through" balancing method is that the area to be protected must be under simulated conditions. This requires that there can be no people or other moving objects in the protected areas during balancing. For a school, factory or a warehouse great inconvenience and expense may be experienced in simulating these conditions.

A further disadvantage of using simulated conditions in balancing is that the test actually requires the use of a moving subject, perhaps a watchman. The size and manner of walk of the test subject, will vary from subject to subject, and even as to the same subject from day to day. A large subject walking through the area to be protected would result in a different signal to the receiver than would a smaller subject. Such variables necessarily decrease the effectiveness of the system and result in more frequent false alarms or an inoperative system.

Another disadvantage of conventional balancing techniques is that they usually require more than one person to balance the system since one individual monitors the master control while the other individual walks through the protected areas. A walkie-talkie or some other means of communication is required to relay information from the master-control unit to the person in the protected area and back again. Thus, human error caused by misunderstanding between the two individuals could result in inadvertent errors which may later result in a false alarm or an inoperative system.

It is therefore an object of this invention to provide a highly reliable and relatively simple method and apparatus for balancing an ultrasonic intruder-detection system.

A further object is to provide a method and apparatus for balancing an ultrasonic intruder-detection system which requires only a single person to balance the system, even in an application where multiple spaces are being protected.

An additional object is to provide a method and apparatus for balancing a detection system which is independent of variables such as the size of a person or his manner and direction of walk.

Another object of this invention is to provide a method and apparatus for balancing a detection system that permits activity within the space to be protected at the time of the balancing and does not require simulated conditions.

Still another object of this invention is to provide a method and apparatus for balancing that is compatible with present detection systems.

It has been found that in ultrasonic detection systems the receiver transducers in acoustically absorbent spaces must be adjusted so as to be more sensitive because of the reduced energy they receive. By the same token, receiver transducers located near spaces having highly reflective surfaces must have their sensitivity attenuated. The acoustical property of an area is termed its relative liveliness. The relative liveliness of a space is directly proportional to the traveling-wave power density in the vicinity of the receiver transducer in that space. Therefore, a balancing of the traveling-wave power density will result in a balancing of the liveliness of the system.

In accordance with the invention a method and apparatus are provided for balancing a detection system of the type which uses the doppler-frequency effect. At least one transmitter transducer is provided which radiates into the area to be protected a spectrum of energy which includes those frequencies which will produce in the detection circuits, signals which blanket substantially the entire bandwidth of the doppler frequencies used for triggering the alarm circuit. This creates in the space being protected an average standing-wave power density proportional to the total traveling-wave power density at the receiver. By transmitting over such a wide spectrum of frequencies during the balancing operations the system is essentially independent of movement within the space to be protected. Any movement will only result in an additional energy component comprising a frequency already present in the space, thereby having little additional affect.

Each receiver transducer's sensitivity is adjustable from either the master-control unit or directly on the transducer. The receiver transducer is removed from its socket and a test fixture is inserted, which contains electronic circuity for measuring average standing-wave power and indicating its proportional value on a signal meter incorporated in it. The receiver test fixture is fitted with pins corresponding to those of the original receiver transducer. The receiver transducer is then connected to the test fixture, also preferably by suitable pins, for a secure fit. The receiver transducer at this location is now ready to be balanced.

Should the entire system use only one receiver transducer the sensitivity of the transducer may be adjusted to a predetermined balance level indicated on the signal meter of the test receiver directly at the master-control unit or at the location of the receiver transducer.

As a general rule each receiver transducer contains a sensitivity adjustment; where more than one receiver transducer is used the sensitivity of each receiver transducer is adjusted individually to the predetermined level indicated on the receiver test fixture's signal meter, although it is possible to have the sensitivity of the individual transducers adjusted at the mastercontrol unit remote from the space to be protected.

The ability to balance the entire system from a remote location is a marked advantage over the prior systems which required a test subject to be in the protected space. Such a system is particularly valuable where, due to circumstances, the receiver transducers may be located in spaces dangerous to personnel, such as bacteriological laboratories or atomicenergy facilities. In this system the test transmitter and receivers form a permanent part of the detection system.

If it is found during balancing that any one receiver transducer is not sensitive enough (shown by the inability to adjust it so that the signal meter of the test receiver reads the proper value) the overall system will need to have its sensitivity increased at the master-control unit.

After each receiver transducer is balanced the test fixture is removed and the receiver transducer is then replaced in its original socket. In this manner the entire system is balanced. The transmitter transducer would now be set to transmit energy at the base frequency fc during the protective phase.

At no time is more than one person required to balance the system. Nor is it necessary to simulate any artificial conditions. In addition, since the same receiver transducers are used in the balancing phase as are actually used during the protective phase and at the same locations, the system is extremely accurately balanced.

The receiver transducers themselves are illustrative of the type having a sensitivity control which is generally in the form of an adjustable potentiometer. Typical transducers are of the type sold by Walter Kidde and Company, Inc., under model number's TR-90, RC-91, which use connector pins to permit easy and secure installation.

For a better understanding of the present invention together with any other further objects thereof, reference is made to the following description taken in connection with the accompanying drawings.

Figure 2:
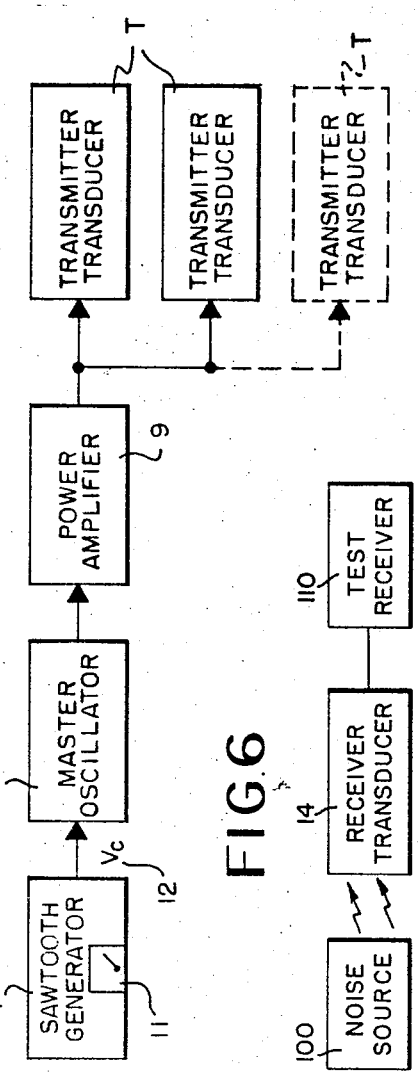
FIG. 2 is a schematic block diagram representing the components of the test transmitter.
Figure 6:
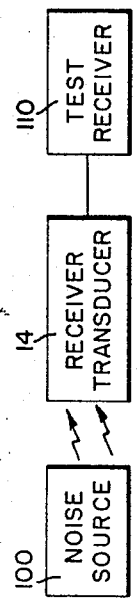
Figure 3:
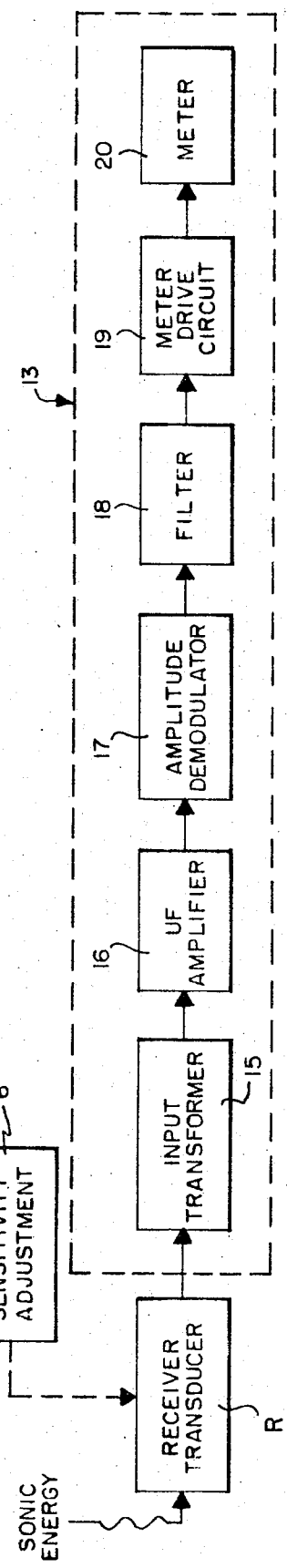
FIG. 3 is a schematic block diagram of the components of the test receiver connected to the receiver trandducer.
Figure 4A:
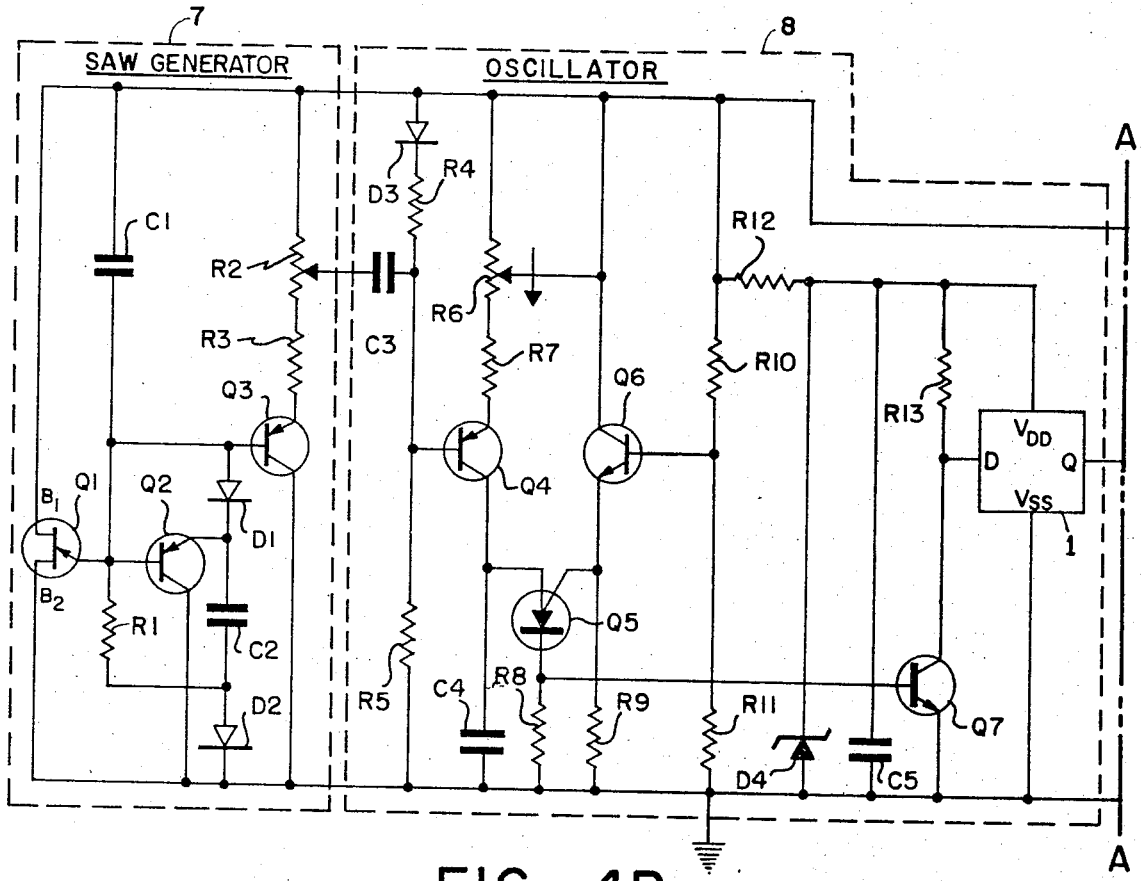
Figure 5:
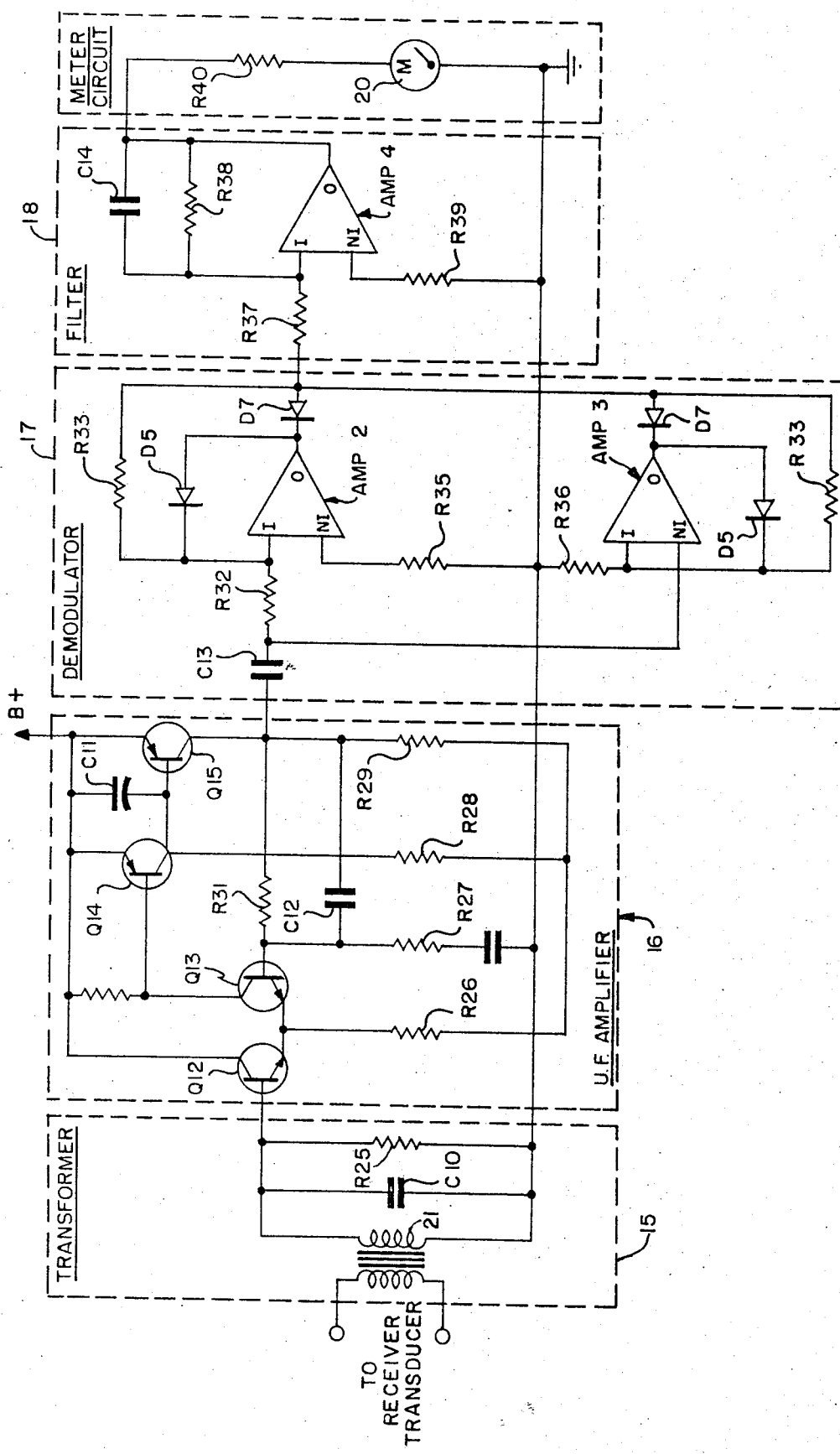

FIGS. 4A and B are a circuit diagram of the transmitter test unit which is shown in block-diagram form in FIG. 2;

FIG. 5 is a circuit diagram of the receiver test fixture which is shown in block-diagram form in FIG. 3; and FIG. 6 is a block diagram showing another embodiment of the invention.

Figure 1:
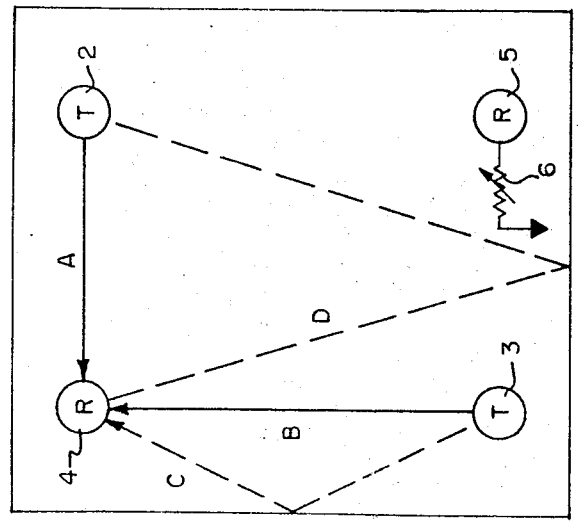
FIG. 1 is a top view of a space to be protected with the placement of the transmitter and receiver transducers shown.

Referring to FIG. 1, a protected area 1 is shown during its protective phase with transmitter transducers 2 and 3 transmitting ultrasonic energy of base frequency fc, produced by a master control unit (not shown), which can be located in the same room or at a remote location and which has a suitable oscillator. The area also contains receiver transducers 4 and 5 which are connected to convey signals back to the master-control unit. The transmitted frequency, $f_c$, is generally in the ultrasonic range, for example, from about 19kHz to about 45kHz, although other frequencies can be used. Each of the receiver transducers has a sensitivity-adjustment control associated with it which is generally in the form of an adjustable potentiometer 6 as shown on the transducer 5.

Direct paths for the radiation of energy from transmitter transducers 2 and 3 to receiver transducer 4 are indicated in FIG. 1 as A and B. Reflected paths for the energy are indicated as C and D. Energy would be received by transducer 5 in a similar manner. Provided that there is no moving object in the protected area, the frequency of the direct and indirect energy received by receiver transducer 4 will be the same $f_c$ and no doppler frequency will be produced in the master-control unit for detection. However, the amplitude and phase of each path of the transmitted energy will be different, thereby resulting in an overall complex standing-wave pattern in the area being protected. However, this standing wave pattern due to the reflection of the transmitter energy is not proportional to the traveling-wave energy in the space to be protected. However, by transmitting energy over a wide spectrum it is possible to obtain a standing wave that is proportional to the traveling-wave energy that can be used to balance the system.

FIG. 2 is a schematic block diagram of a test transmitter for use with a test receiver, the test transmitter being capable of producing a spectrum of ultrasonic energy of substantially uniform amplitude with frequencies centered on the base frequency $f_{rc}$, over at least twice the bandwidth of the doppler frequency bandwidth of the master-control receiver, $f_c \pm f_d$.

The test transmitter includes a sawtooth voltage generator 7, a master oscillator 8 and a power amplifier 9. The test transmitter output is connected to the conventional transmitter transducers T either in the space being protected or at the central location.

The sawtooth generator is preferably a linear-sweep type circuit capable of producing a substantially linear sawtooth voltage output Vc. The electrical circuit of the generator is also provided with a switch 11 so as to be able to operate the generator in a second mode. In the second mode a constant voltage supply is provided to the oscillator so that the test transmitter is operated at a base frequency, $f_c$ during the protective phase of the system's operation.

The output, Vc, of the voltage generator 7 serves as the input to the oscillator 8. The oscillator is frequency-voltage sensitive and has an instantaneous frequency deviation proportional to its voltage input. When the voltage generator provides a constant-voltage mid point between the maximum and minimum voltage values of the sawtooth wave, the oscillator is so callibrated as to generate an output signal of frequency $f_c$.

The output signal from the oscillator is then amplified by a conventional power amplifier 9 so as to have sufficient power to drive the required number of transmitter transducers T in the system.

The operation of the test transmitter will be discussed in greater detail in connection with FIG. 4.

The sawtooth generator 7 includes a complementary unijunction transistor Q1 with base B1 connected to B+ and base B2 connected to ground. Its emitter is connected to the junction of resistor R1 and capacitor C1 which form an RC charge circuit. At the beginning of each sawtooth sweep, the voltage across capacitor C1 is low (approximately equal to Vd of transistor Q1) and begins to increase because of charging current flowing through R1. As the voltage across capacitor C1 increases, the potential at the base of transistor Q2, which is also connected to the junction of resistor R1 and capacitor C1, decreases. Since transistor Q2 is common-collector operated, the decrease in potential at the base of transistor Q2 appears at its emitter and hence is applied to the positive terminal of capacitor C2. Thus the negative terminal of capacitor C2 also goes negative effectively bootstrapping the negative terminal of resistor R1. This results in a relatively constant voltage across resistor R1 causing a nearly constant current to flow through resistor R1 resulting in a nearly constant rate of change of voltage across capacitor C1. Thus a nearly linear, decreasing sweep of potential is effected at the negative plate of capacitor C1.

The process continues until the firing point of transistor Q1 is reached at which time transistor Q1 fires discharging capacitor C1. During the discharge, diode D1, connected between the base and emitter of transistor Q2, becomes forward biased as does diode D2, which is connected between the negative terminal of capacitor C2 and ground, thus forming a series circuit for replenishing capacitor C2 with the charge it lost while bootstrapping. Since the value of capacitor C2 is very much greater than the value of capacitor C1 the deviation from true linearity is small since the fractional deviation is proportional to $C1/(C1 + C2)$. The cycle repeats.

At the same time that the voltage is decreasing at capacitor C1, the base of transistor Q3 which is connected to the negative plate of capacitor C1 follows the decreasing voltage drawing current through resistor R3 and potentiometer R2 which is connected through the emitter terminal of transistor Q3 to the positive voltage supply, thereby creating a linearly increasing voltage sweep across the potentiometer.

The output of the sawtooth voltage generator is then capacitively coupled through capacitor C3 to the oscillator 8 portion of the test transmitter.

When the value of the resistance of potentiometer R2 is set at zero there is a constant current flowing from the collector of transistor Q4 which charges capacitor C4. The value of the current is set by a voltage divider consisting of resistor R4 which is connected to the positive voltage supply through diode D3 and to ground through resistor R5.

When the value of the voltalge across capacitor C4 reaches the firing voltage of programable unijunction transistor (PUT) Q5, which has its anode connected to the collector of transistor Q4 and its cathode connected to ground through resistor R8, PUT Q5 fires and rapidly discharges capacitor C4 through PUT Q5 to the base of transistor Q7 producing a pulse. These pulses are repetitively produced and are spaced equidistant in time.

As the value of the resistance of the potentiometer R2 is increased the sawtooth voltage is placed on top of the dc value of the voltage supply at the input of Q4. When the voltage of the sawtooth wave at R2 is above the dc voltage, the current through transistor Q4 increases resulting in a more rapid charge of capacitor C4 and a consequent more rapid firing of PUT Q5, that is, the pulses are produced at a higher rate at the base of transistor Q7. When the voltage of the sawtooth wave is below the dc voltage, the current through transistor Q4 decreases resulting in a slower charging of capacitor C4 and accordingly applied to Q4 pulses at the base of transistor Q7.

By varying the amplitude of the sweep ramp (by varying the setting of potentiometer R2) it is possible to regulate the range of frequencies of the impulses generated. In the preferred embodiment the range is sufficient to cover at least the entire frequency spectrum of the master-control doppler-frequency circuitry.

The potentiometer R6, connected to the positive voltage supply and to the emitter of transistor Q4 through resistor R7 serves to control the average current flowing through the base of transistor Q4 and to the capacitor C4, thereby regulating the center frequency of pulses at the base of transistor Q7.

Diode D3 and transistor Q6 compensate for the temperature variations affecting the base to emitter junctions of transistor Q4 and the gate-to-anode junction voltage of PUT Q5. Transistor Q6 also serves to set the firing point at the gate of PUT Q5 as well as presenting a low impedance at the gate of PUT Q5, increasing the valley current, thereby assuring a fast turnoff.

The positive pulses produced at base of transistor Q7 produce corresponding negative going pulses at the collector of transistor Q7 which is connected to the positive voltage supply through resistor R13 and to the input terminal D of flip-flop 1. The output of flip-flop is a constant amplitude voltage. Each input pulse from Q7 toggles the flip-flop causing it to change its state. Therefore the train of pulses at the input of the flip-flop results in a train of square waves with widths corresponding to the frequency of the input pulses.

Thus, as the pulse rate output of PUT Q5 changes as a function of the sawtooth voltage from generator 7, the pulse rate of flip flop 1 changes accordingly.

Zener diode D4 and capacitor C5 are used as a voltage regulator to ensure a uniform supply voltage to flip-flop 1 independent of the B+ supply voltage.

The square-wave output from the flip-flop is applied to a conventional power-amplifier circuit 9 which includes an operational amplifier AMP1 having a feedback capacitor C7 and feedback resistor R17 so that the operational amplifier acts as filter, restricting the high frequency components of the square waves. The resulting frequency response produces rounded-off square waves.

The amplifier 9 further includes transistors Q8, Q9, Q10 and Q11 connected as a double quasi-complementary amplifier which operates to amplify the rounded-off square-wave output of operational amplifier AMP1. Resistors R21-24 operate to protect transistors Q8-Q11 of the amplifier circuit from possible short-circuit damage while capacitors C8 and C9 serve to filter any unwanted frequencies from being fed to the transistor transducers.

The output of the circuit of FIG. 4 to the transmitter transducer T is now a wave of substantially uniform amplitude and of a varying, or swept, frequency. This electrical signal is then converted by the transmitter transducer T to an acoustical energy signal which is transmitted into the space to be protected.

While in the preferred embodiment of the test transmitter sonic energy transmittted has a substantially uniform and well-behaved amplitude, it is recognized that wide variations in the amplitude of the transmitted energy are still satisfactory and do not impair the ability to accurately operate the invention.

In FIG. 3 is shown a test receiver 13 for use with a receiver transducer R having a sensitivity-adjustment control 6 including an input transformer 15, an ultrasonic frequency amplifier 16, an amplitude demodulator 17, filter 18, meter drive circuit 19 and meter 20.

The transducer R is to be connected to the input of test receiver 13 which is not connected to the circuitry of the master circuit.

The operation of the test receiver will be discussed in greater detail in connection with FIG. 5.

The receiver transducer R converts the ultrasonic energy present in the protected space from the transmitter transducer into an electrical signal proportional to the instantaneous sound pressure energy.

The electrical signal from the receiver transducer R is transmitted to input transformer 15 which has resistor R25 and capacitor C10 in parallel circuit across the secondary winding 21. The transformer provides a low impedance to the receiver transducer so as to simulate the low input impedance of the master-control receiver input. This is necessary so that each receiver-transducer output signal is independent of the number of other receiver transducers placed in parallel across the master-control receiver input terminals.

The electrical signal is then amplified in ultrasonic frequency amplifier 16 to an output suitable for driving the amplitude demodulator. The ultrasonic-frequency amplifier operates in the conventional manner and includes four transistors Q12 – Q15 with the emitters of transistor Q12 and Q13 connected to the collector of transistor Q15 through series resistors R26 and R29 and to the collector of transistor Q14 through series resistors R26 and R28. A feedback circuit consisting of capacitor C12 in parallel with resistor R31 connects the collector of transistor Q15 to base of transistor Q13.

The output signal from the ultrasonic-frequency amplifier is then rectified by the amplitude demodulator circuit 17 which includes a pair of operational amplifiers AMP2 and AMP3 each of which has a respective feedback circuit consisting of a diode D5 in parallel with a series circuit comprising a diode D7 and a resistor R33. Diode D5 is poled oppositely to D7 and a resistor R33. The non-invert input terminal of AMP2 is connected to ground through resistor R35 as is the invert input terminal of AMP3 through R36. The feedback diodes D5 and D7 insure that only the properly biased signals are permitted to pass, thereby resulting in a full-wave rectified signal. The amplified signal is applied through C13 to the invert input of AMP2 and the non-invert input of AMP3 so there is full wave rectification.

The full-wave rectified signal is then filtered by the filter circuit 18 which includes an operational amplifier AMP4 with a feedback circuit comprising a resistor R38 in parallel with capacitor C14. The non-invert input terminal is grounded through resistor R39. The filter converts the demodulated electrical signal to a direct voltage which is proportioned to the square root of the applied signal, which is the average sound energy density impinging on the receiver transducer.

The meter 20 has a "red-line" value indicated on its face. This value has been predetermined and indicates when the receiver transducer has been adjusted to the balanced-condition sensitivity.

In operation of the balancing system the test transmitter 14 is activated so as to cause the transmitter transducers T to produce a spectrum of energy over at least the bandwidth of frequencies of the doppler-signal detection circuitry of the master-control unit. It is possible, however, to produce energy having a spectrum of frequencies greater than the bandwidth of the doppler-signal circuit without affecting the present system's ability to balance. Any frequency falling outside of the bandwidth of the doppler-signal circuit can be filtered by appropriate circuits, in a manner old and well-known.

The greater the number of different frequencies transmitted within the bandwidth of the doppler-signal circuitry, the greater the accuracy of the balancing system, since the accuracy of the system obeys the mathematical laws of distributed samples of events.

Figure 4B:
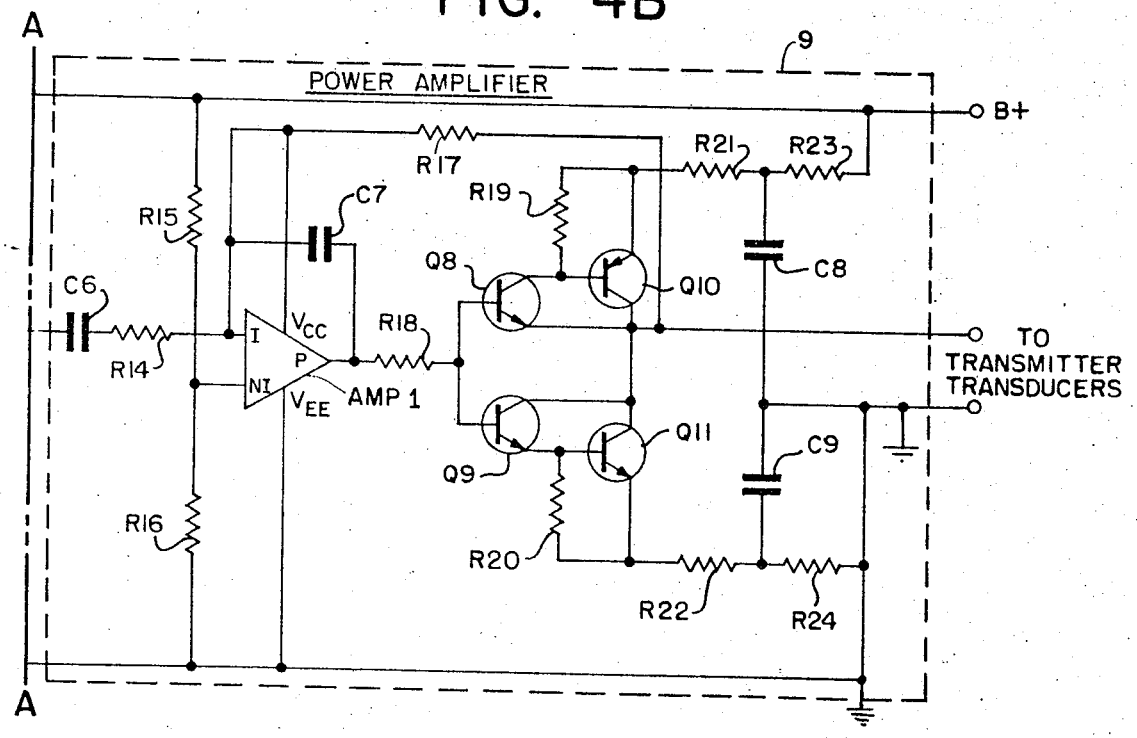

Many other methods of producing sonic energy having a closely-spaced frequency distribution may be used, the circuit shown in FIG. 3 and described in detail in FIGS. 4A and 4B, which uses angle modulation, being only one. For example, amplitude modulation utilizing filtered white noise as the modulating signal, or amplitude modulation using a multiple-frequency modulating signal. The former is shown in FIG. 6 wherein block 100 represents the noise source and block 110 the test receiver. The noise source 100 can be of any suitable conventional construction. The receiver can be that of FIG. 3. Other such means will be readily apparent to one of ordinary skill.

The transmission of such sonic energy results in an average standing-wave power density proportional to the total traveling-wave power density at the receiver transducer. This is because some of the frequencies will form low standing-wave amplitudes at a particular receiver transducer, whereas other frequencies will tend to result in large standing-wave amplitudes at the same transducer, thereby creating an overall average standing wave.

The transmitted signal is picked up by the receiver transducer R which is attached to the test unit 13. The received signal is converted to an electrical signal, and displayed on display meter 20. On the display meter is a "red-line" value indicating the desired preset sensitivity of the receiver transducer. The sensitivity-adjustment control 6 of the receiver transducer R is then manipulated until the electrical signal received by meter 20 equals the "red-line" value. The test receiver 13, which had been inserted in the socket of the original receiver transducer, by means of pins, may now be removed and receiver transducer R replaced. This adjustment is then made in each of the other receiver transducers so as to balance the overall system.

By appropriate electrical switching it is possible to leave the test receiver in place in the socket so that the system may be entirely balanced from a remote location without the necessity of any physical manipulation of the components.

In a typical embodiment of the invention the ultrasonic detection system emits a base frequency of 19,200 cycles per second during operation. During the balancing phase of the system, the test transmitter transmits ultrasonic frequencies of generally uniform amplitude approximately five cycles apart, over a 4,000 cycle bandwidth, 2,000 cycles on either side of the base frequency. The greater the number of such frequencies transmitted within $f_c \pm f_d$ band, the higher the accuracy of the balancing system.

While there have been described what are considered to be the preferred embodiments of the invention, it will be obvious to those skilled in the art that various changes and modifications may be made therein without departing from the invention, and it is, therefore, aimed to cover all such changes and modifications as falls within the true spirit and scope of the invention.

What is claimed is:

1. Apparatus for adjusting the sensitivity of a receiver transducer of an intruder detection system for protecting a given space, said system being of the type including means for producing a base frequency signal $f_c$ which is transmitted into said space and from which a range of doppler frequency signals are generated in the space as a function of physical events occurring in the space, alarm means, and first means responsive to the base frequency signal $f_c$ and a range of doppler frequency signals received from said space to actuate said alarm means; the improvement comprising at least one receiver transducer means in said space whose sensitivity is to be adjusted, means for transmitting into said space for receipt by said receiver transducer a test signal independent of said base frequency signal, said test signal having a spectrum of components of energy of different frequencies including those which would normally include at least a portion of the doppler frequencies generated in said space as a function of said base frequency signal, means coupled to said receiver transducer means for producing an output signal in response to and representative of the amplitudes of spectral components of the test signal received by said receiver transducer means, and means for adjusting the sensitivity of said receiver transducer means.

2. Apparatus as in claim 1 wherein said transmitting means transmits into the space to be protected a test signal having a spectrum of components of energy in the range $f_c \pm f_d$, where $f_d$ is the range of doppler frequency signals to which said first means is responsive.

3. Apparatus as in claim 1 wherein said transmitting means transmits a test signal whose components of energy are of substantially equal amplitude over the spectrum.

4. Apparatus as in claim 2 wherein said transmitting means includes oscillating means, and means for changing the frequency of the components of energy produced by said oscillating means.

5. Apparatus as in claim 4 wherein said means for changing the frequency of the components of energy produced by said oscillating means comprises a noise source.

6. Apparatus as in claim 1 wherein said transmitting means also includes means for transmitting only the base frequency signal $f_c$ for the system.

7. Apparatus as in claim 1 wherein there are a plurality of said receiver transducers in the said space.

8. Apparatus as in claim 1 wherein said means for adjusting the amplitude of said output signal is located at the receiver transducer whose sensitivity is being adjusted.

9. Apparatus as in claim 1 wherein said means for producing said output signal includes test receiver means in said space separate from said first means of the system.

10. Apparatus as in claim 9 wherein said test receiver means is adapted to have electrically coupled thereto said receiver transducer located in the given space whose sensitivity is to be adjusted.

11. Apparatus as in claim 10 wherein said means for adjusting the amplitude of said output signal comprises attenuator means located at the receiver transducer.

12. Apparatus as in claim 10 wherein said test receiver means includes means for producing an indication of the amplitude of the energy received by said receiver transducer means whose sensitivity is being adjusted.

13. Apparatus as in claim 12 wherein said means for adjusting the amplitude of said output signal comprises attenuator means located at the receiver transducer.

14. Apparatus as in claim 12 wherein said indicating means includes a meter.

15. Apparatus as in claim 9 wherein a said receiver transducer includes a fixture mounted at a predetermined location in said space to which a said receiver transducer is detachably connected, and said test receiver means includes means adapted to be connected to said fixture with the said receiver transducer means being connected to said test receiver.

16. Apparatus as in claim 10 wherein said test receiver means produces said output signal which is proportional to the average energy received by said receiver transducer means.

* * * * *